Oct. 12, 1937.  G. A. TINNERMAN  2,095,895
FASTENING DEVICE
Filed July 17, 1936
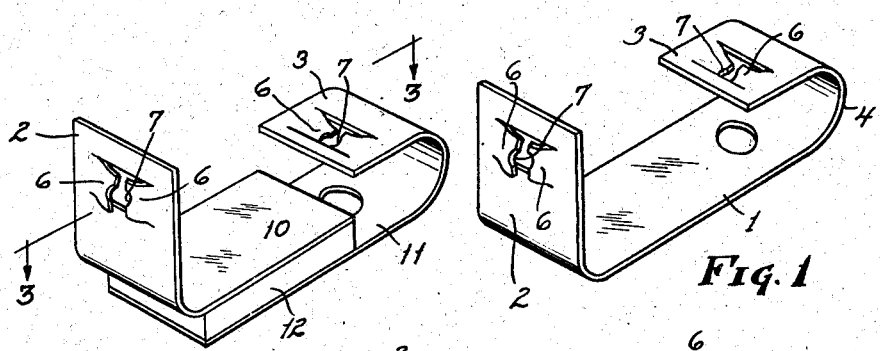
Fig. 2
Fig. 1
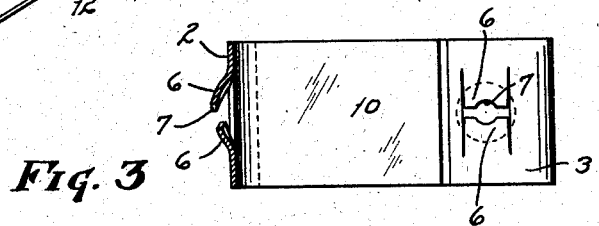
Fig. 3
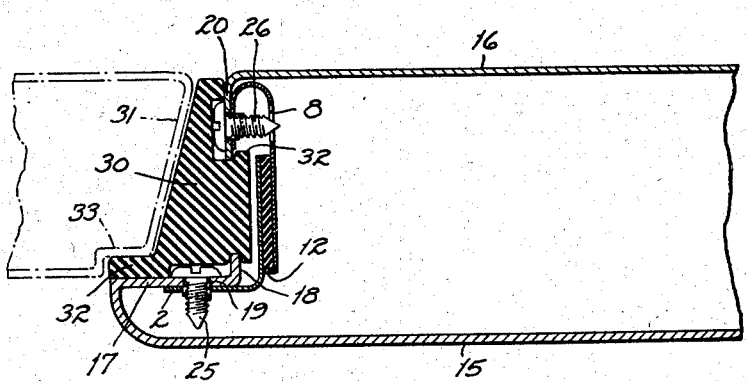
Fig. 4
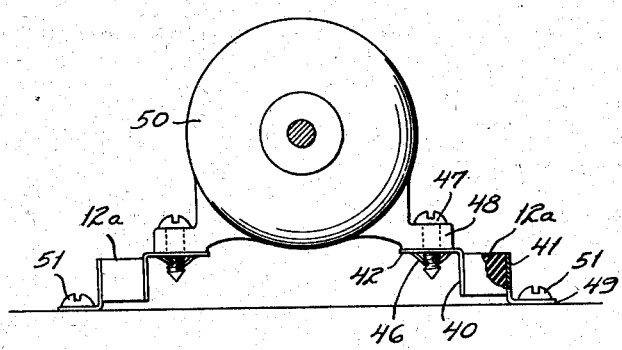
Fig. 5
INVENTOR.
GEORGE A. TINNERMAN
BY Bates, Golrick & Teare
ATTORNEYS Patented Oct. 12, 1937

2,095,895

UNITED STATES PATENT OFFICE 2,095,895

FASTENING DEVICE

George A. Tinnerman, Rocky River, Ohio, assignor to Albert H. Tinnerman, Cleveland, Ohio Application July 17, 1936, Serial No. 91,172

6 Claims. (Cl. 189—36)

This invention relates to an improvement in fasteners or connectors for spaced parts, and specifically to an improvement in spring fasteners of the type employing indented sheet-metal tongues adapted to engage the threads of a bolt or screw in a manner to form in effect a "self-locking" nut for preventing turning of the screw out of position.

An object is to provide an improved connecting device for spaced parts, which device includes an automatically locking spring nut engageable by a securing screw.

Another object is to provide a connector for spaced parts, by the use of which the spaced parts normally may be held securely in operative relationship, while nevertheless some relative movement between the connected parts is permitted, e. g.: to compensate for inaccuracy in the formation of the connected parts, or to permit slight relative motion of the connected parts for dampening sound transmission, or to prevent or deter conductivity of heat or sound waves from one of the connected parts to the other.

A specific object is to provide a connecting fastener for inner and outer panels of door or wall constructions, whereby the panels may be easily and quickly assembled in a definite relationship, notwithstanding variations in details of manufacture with respect to fastener openings, and which fastener may be arranged to prevent transmission of vibrations, sound or heat waves, therethrough from one connected part to another.

Still another object is to provide a door construction for cabinets, refrigerators and the like, having inner and outer panels which are to be maintained in spaced relationship, which construction will obviate the necessity for the usual breaker strips, will provide a common support for fasteners, such as screws, and will effectively accommodate resilient sealing strips, when such are desired, as between the door and its frame.

Another specific object is to provide a spring-fastener-equipped mounting for objects, such as electric motors and/or power transmission mechanism for units, such as refrigerators, air-conditioning equipment, and motor-driven apparatus generally, which mounting is adapted and arranged for absorbing shock and reducing wave transmission generally.

Other objects and features of the invention will become apparent from the following description relating to the accompanying drawing, showing illustrative embodiments. The essential characteristics are summarized in the claims.

A device incorporating the invention is shown in two general forms, one comprising a fastener for spaced parts, including a body having flange effects at an angle to each other and screw or bolt-receiving spring tongues on at least one of the flange effects, preferably both. In the other general form, the flanges, one or more of which has or have spring tongues, are parallel but in different planes. The spring tongues, in case a plurality of pairs or sets are used on one device, preferably extend on opposite sides of the metal body material forming the device, but in some instances may extend in the same direction with respect to such body material.

Referring to the drawing, Fig. 1 is a perspective view of the connecting fastener in one specific form, the same being made from a single piece of sheet metal; Fig. 2 is a perspective view of a similar device formed in three parts; Fig. 3 is a sectional plan view of the device of Fig. 2, taken substantially along a plane falling on the line 3—3 on Fig. 2; Fig. 4 is an assembly view of a composite panel and door-seal construction incorporating the device according to Fig. 2, said device being shown in central longitudinal cross-section; and Fig. 5 shows the fastening connector hereof in the second-mentioned form, serving as a support for an electric motor.

Referring specifically to Fig. 1, this shows a sheet metal body at 1, having a flange 2 at one end, which is bent substantially at right angles to the body 1. The opposite end of the body has a flange 3, formed by an open return bend 4, disposing the major portion of the flange into parallelism with the body 1, but spaced from it. Both flanges 2 and 3, as shown, are provided with oppositely extending spring tongues 6, partially severed from the sheet metal of the respective flanges and out-struck from the planes thereof in the form of arches which are open at the top. The tongues are suitably indented, as indicated at 7, the indentations being of any suitable contour as determined by the character of the bolt or screw with which the fastener is to be used. As shown in Figs. 1 to 3, the indented extremities of the tongues may have "pitch" corresponding generally to the thread pitch of such bolt or screw to be engaged by the tongues. It will be noted that the tongues of the two sets are out-struck from the metal stock in opposite directions.

Preferably there is an enlarged opening 8, aligned with the axis of the indentations in the tongues of the flange 3, said opening loosely receiving the extremity of the fastening bolt or screw when this is long enough to reach the body 1. The application of the device to the work will be described in connection with the form shown in Figs. 2 and 3.

The device, according to Figs. 2 and 3, comprises separate sheet-metal body members, shown in the form of strips 10 and 11, for supporting the flanges 2 and 3, said flanges and their bolt or screw-receiving apertures and tongues being identical with the showing thereof in Fig. 1. For convenience, the body member 10 will be considered on the front face of the device and the member 11 on the back face. Connecting the two strips 10 and 11 therebetween is suitable interposed yielding or insulating material 12, the character of which is determined largely by the specific use of the fastener. Preferably, the strip of material 12 is rubber, the same being firmly vulcanized to both metal strips or otherwise suitably secured. Rubber, so interposed, will absorb vibrations, as well as act to deter or prevent the conduction of heat and sound waves from one metal part of the fastener to the other. Thus, spaced parts connected by the fastener are insulated from each other as to vibrations, noise and heat.

Referring now to an illustrative use for the fastener, in either form above described, and specifically to Fig. 4, outer and inner panels of a door construction are indicated respectively at 15 and 16. The outer panel, as is usual in refrigerator door construction, is flanged inwardly continuously about its margin, as at 17, and the margin of the inturned flange is turned at right angles, as shown, forming a shorter flange effect 18, extending normal to the plane of the door. The flange 17 has a series of openings, one being shown at 19, for receiving fastening members, such as bolts or screws, one screw being shown at 25 engaging the tongues of the fastener flange 2. The panel 16 has a marginal flange, indicated at 20, which is similarly apertured to receive screws 26 engaging the tongues of the flange 3. In the desired assembled relationship of the two panels, the marginal flange 20 is substantially aligned with the short flange effect 18 of the panel 15 and spaced therefrom. Ordinarily, solid wood or composition breaker strips are used, marginally to connect the door panels for reducing heat transmission losses. One feature of the present device is that it displaces such breaker strips.

It is apparent that if the panel flanges or the holes in the panel flanges which receive the screws, are not accurately related, the tongue-supporting flanges of the fasteners may be moved relatively by stretching or warping the rubber connection in the operation of placing the screws; but that, after the screws have been driven home, the panels will be snugly held against excessive relative movement. The panels 15 and 16 are insulated from each other by the mutually securing fasteners, and only enough relative movement is permitted to dampen sound waves, i. e. to prevent the outer panel from being vibrated by the inner panel.

The rubber strip 12 vulcanized to the body strips 10 and 11, constitutes: a yielding, an insulative; and a vibration dampening connection between the bolt-thread-gripping spring fasteners,—and any other means serving one or more of said functions may be substituted.

A rubber e. g. sealing strip 30 is shown at the face of the door adjacent the door frame or jamb 31, the outer face of the strip being inclined complementary to the frame opening. A flange 32 lies in the edge recess 33 to form a rabbet. Usually, the sealing strip extends continuously about the perimeter of the door, and may have a "dovetail" securing rib portion 32, which snaps into place between the proximate edges of the aligned flanges 18 and 20. It will be noted that the fastener hereof affords adequate clearance for the dovetail rib.

In the form of device shown in Fig. 5, the yielding element corresponding to the strip 12 in Figs. 2 to 4, is modified to comprise a fairly heavy block 12a of rubber or other suitable material against which the body portions 40 and 41 corresponding to the body plates 10 and 11 on Fig. 2 e. g. are vulcanized or otherwise securely fixed. The plate 40 has a flange 42 extending at right angles thereto with indented bolt or screw-thread-receiving tongues 46 to embrace the attaching bolts 47 depending from the leg portions 48 of the motor frame 50. The body members 41, in the particular form of attaching fasteners shown, have flanges 49 extending at right angles therefrom as a base. The flanges may have simple holes to receive fastening screws or bolts, the heads of which are indicated at 51, or the flanges 49 may be equipped with spring tongues of the character shown in Figs. 2 and 3 or other suitable form.

In the last described arrangement, it will be seen that the yielding blocks 12a function to allow considerable variation in the relative positioning of the screw-receiving openings in the flanges 42 and 49, and further, that the rubber blocks dampen vibrations of the motor or other mechanism supported on the flanges 42, and will tend to prevent transmission of sound or heat to the support to which the flanges 49 are secured.

I claim:

1. Connecting means for securing parts in spaced relation, comprising a body portion and flanges extending in different planes with respect to said body portion, said flanges being yieldable with respect to each other and relative to said body portion, at least one of said flanges being provided with integral means deformed from the plane thereof for receiving fastening elements for securing said flanges to said spaced parts, whereby said connecting means may give under force through the relative yieldable flanges and in the area of said integral fastener receiving means.

2. Connecting means for securing parts in spaced relation in a structure, comprising a body portion and flanges extending in different planes with respect to said body portion, said flanges being yieldable with respect to each other and relative to said body portion, at least one of said flanges being provided with integral yieldable means deformed to project from the plane thereof for receiving fastening elements for securing said flanges to said spaced parts, whereby said connecting means may give under force through the relative yieldable flanges and in the area of said integral yieldable fastener receiving means to compensate for manufacturing variations and strains set up in the assembly or incident to use of the structure.

3. In a joint structure comprising spaced panels having marginal flanges disposed at angles to each other, the combination of connecting means for securing said panels in spaced relation, said connecting means comprising a body portion and flanges relatively yieldable with respect to each other and said body portion, said flanges being formed at such angle to said body portion as to seat against the marginal flanges of said panels, and said flanges being provided with means adapted to receive fastening elements for securing said marginal flanges of the panels to the relatively yieldable flanges of said connecting means, whereby said connecting means may give under force to compensate for manufacturing variations and strains set up in the assembly or incident to use of the structure.

4. In a joint structure comprising spaced panels having marginal flanges disposed at angles to each other, the combination of connecting means for securing said panels in spaced relation, said connecting means comprising a body portion and flanges relatively yieldable with respect to each other and said body portion, said flanges being formed at such angle to said body portion as to seat against the marginal flanges of said panels, and said flanges being provided with integral, yieldable fastener receiving means deformed from the plane thereof and adapted to receive fastening elements for securing the marginal flanges of the panels to the relatively yieldable flanges of the connecting means, whereby said connecting means may give under force through the relatively yieldable flanges and in the area of said integral yieldable fastener receiving means to compensate for irregularities and manufacturing variations in the panels.

5. Connecting means for securing parts in spaced relation in a structure, comprising, a body portion including an elastic element and metallic members bonded to said elastic element, said metallic members having flanges extending in different planes with respect to said body portion, said flanges being yieldable with respect to each other and relative to said body portion, said flanges being provided with integral means deformed from the plane thereof for receiving fastening elements for securing said flanges to said spaced parts, whereby said connecting means may give under force through the elastic element, the relatively yieldable flanges and in the area of said integral fastener receiving means to compensate for manufacturing variations and strains set up in the assembly or incident to use of the structure.

6. In a joint structure comprising spaced panels having marginal flanges disposed at angles to each other, the combination of a connecting means for securing said panels in spaced relation, said connecting means comprising a body portion including an elastic element and metallic members bonded thereto, said metallic members having flanges relatively yieldable with respect to each other and to said body portion, said flanges being formed at such angle to said body portion as to seat against the marginal flanges of said panels, and said flanges being provided with integral, yieldable fastener receiving means deformed from the plane thereof and adapted to receive fastening elements for securing said marginal flanges of the panels to the relatively yieldable flanges of the connecting means, whereby said connecting means may give under force through the elastic element, the relatively yieldable flanges, and in the area of said integral yieldable fastener receiving means to compensate for manufacturing variations and strains set up in the assembly or incident to use of the structure.

GEORGE A. TINNERMAN.